United States Patent Office 2,702,756
Patented Feb. 22, 1955

2,702,756

ELECTRICALLY CONDUCTIVE WAX COMPOSITIONS

Sam Kurlandsky, Freeport, Ill., assignor to Burgess Battery Company, Freeport, Ill., a corporation of Delaware No Drawing. Application May 13, 1950, Serial No. 161,893

10 Claims. (Cl. 106—272)

This invention relates to electrically conductive compositions having a waxlike base and a moderate melting point.

Electrical connection between two conductors contiguous to each other is commonly provided by means of a suitable solder which, generally with the aid of a flux, alloys or welds to a limited extent with the surfaces of the conductors. Conductive compositions, such as carbon impregnated varnishes or, more recently, silver paints and the like, have been used for this purpose. The use of solder has been restricted because of the difficulty of soldering to certain metals such as magnesium, the impossibility of soldering directly to carbon, the relatively high temperatures required which may adversely affect environmental materials and parts, and corrosion caused by the fluxes employed. Also, the soldering operation requires special equipment and careful technique.

The non-solder conductive compositions heretofore proposed have not been entirely satisfactory. The carbon impregnated materials exhibit low electrical conductance and the paint-like products require considerable time to dry or set. Solvents used sometimes cause trouble due to their effect on other materials and parts and evaporation of the solvent may result in undesirable porosity of the conductive mass. Once set, these compositions cannot be softened or liquified without destruction or dissolution of the material.

The object of this invention is to provide an electrically conductive composition having a relatively high specific conductance and which is solid at room temperatures but melts at a moderately warm temperature to a fluid body of relatively low viscosity. A further object is to provide a solder-like material in, for example, wire form, having a base or binder of waxlike material, which may be used to provide positive low resistance electrical connection between two conductors. A further object is to provide such a material capable of making low resistance contact with the surface of a conductor of any material without the necessity of heating either the material or the conductor to the high temperatures required in a soldering operation and without the use of solvents or vehicles which require time to dry or undergo chemical change in setting. Another object of the invention is to provide a method of making compositions having these qualities.

The conductive composition according to the invention consists essentially of a base of waxlike material impregnated with finely divided silver. The waxlike base serves as a binder for the silver particles, the product being a coherent mass which may be extruded into wire form for convenient storage and use. In addition, the waxy base serves as a lubricant which promotes fluid motion of the mass and the individual silver particles with respect to each other in both the manufacture and the use of the composition.

A characteristic of major importance in the conductive compositions of the invention is their electrical conductivity. It is desirable, of course, to approach as nearly as possible the conductivity of solder in order that highly conductive electrical connections may be made without unduly extending the cross-sectional area of the conductive composition through which the current must flow. Known compositions having relatively low conductivities, such as the carbon or graphite filled linseed oil, varnishes, and the like, enjoy very limited applications because they must be applied to large surfaces and maintain large cross-sectional areas through which the electrical current may flow in order to provide sufficient conductance. The present invention is not subject to this handicap and may be used more like solder itself as a consequence of its high conductivity.

The conductivity of the silver-waxlike base compositions of this invention appears to depend largely upon the high ratio of silver to base material in the composition. The peculiar characteristics of the waxlike binder-lubricants used as the base material in preparing these compositions permit the very heavy loading of the binder-lubricant with silver within the limit of adequate cohesion of the mass in both solid and fluid states. Lubrication furnished by the waxy material appears to facilitate the relative movement of the particles and permit their orientation into a crowded pattern within the mass.

The proportion of silver that will be taken up by the base material appears to depend, at least in part, upon the form of the silver particles, as well as upon the characteristics of the binder-lubricant base material. It has been found that microcrystalline wax, for example, will absorb and bind together as much as about four times its own weight of precipitated silver, resulting in a product which is approximately 80% silver and 20% binder. This product is highly conductive and is satisfactory for many uses.

The silver load capacity of a composition made from precipitated silver may be increased and the conductance greatly improved by pre-treatment of the silver particles. An average sample of commercial precipitated silver may have a size range of from 2 to 100 microns and an apparent density of about 1½ grams per cubic centimeter. The milling of this material by any suitable means as, for example, in a ball mill, reduces the average particle size and increases the apparent density of a given quantity of the silver particles. It is evident that the porosity of the individual particles and surface form thereof are altered as the particles are worked during the milling operation.

By continuing the milling operation for a sufficient length of time, the apparent density of the silver particles can be increased from 1.5 to 4.0 grams per cubic centimeter, and even higher. The mill ground product may range in particle size from 2 to 50 microns. This mechanically treated silver powder is taken up by the waxlike binder-lubricant to the extent of 85% to 90% of the weight of the resulting composition. The resulting increase in specific conductance of the composition is substantially in excess of the increase in the proportion of silver, the conductivity characteristic of the composition increasing steeply as the amount of silver in the composition approaches the saturation point; that is, the point beyond which the mass is no longer coherent. Thus, it is desirable to load or saturate the base material with silver in preparing the conductive composition.

Although microcrystalline wax is the preferred base for the conductive compositions herein described, other waxlike binder-lubricants may be used with satisfactory results. Examples of other suitable materials are as follows: beeswax, paraffin, candelilla, montan, ceresin, carnauba, Brazil, ozocerite. The characteristics of these materials which appear to be of greatest importance in their use in the conductive compositions of this invention include a rather sharp melting point and transition from solid to highly fluid state, chemical stability at elevated temperatures, and lubrication qualities.

The silver load capacities of compositions employing a soft wax, such as microcrystalline or beeswax, can be further enhanced by the use of a minor proportion of a hard wax, such as carnauba or candelilla, to form a binder-lubricant mixture. The proportions used are not critical, a ratio of four parts of soft to one part of hard wax being satisfactory.

In preparing a preferred composition, precipitated silver powder is milled in a ball mill until the apparent density of the material is about 4 grams per cubic centimeter. The quantity of binder-lubricant (4 parts of microcrystalline to 1 part of carnauba wax) required to prepare the desired amount of conductive composition, say 10 grams, is weighed out and melted. A proportionate amount of the ball milled precipitated silver, say 110 grams, is then added slowly to the molten wax with continuous stirring while maintaining the temperature of the mixture. When all of the silver has been incorporated into the mass, it is cooled and may then be extruded in wire form for convenient storage and handling.

It should be here pointed out that the silver particles used in the conductive compositions may be prepared by the dry reduction of oxides of silver, by spraying, by an electrolytic process, and by other processes, as well as by chemical precipitation. The characteristics of the compositions made from the different forms of silver particles differ somewhat, but useful compositions may be prepared from any of these several forms of raw material.

In using the conductive composition to electrically connect two conductors, the material may be applied in a manner similar to that employed in a soldering operation, except that it is only necessary to moderately warm the waxy composition and no flux is required. Since the composition is not sufficiently adhesive to serve as a mechanical bonding agent, other means must be employed for holding the conductors to be electrically connected together. In most applications, this presents no serious problem since the conductors are generally normally in contact or contiguous anyway. Depending upon the nature of the surface of the conductor, the composition will adhere more or less tenaciously, generally sufficient to hold its mass in position. Since it melts at moderate temperatures, one method of application is to apply the composition to the two conductors to be connected and thereafter bring them together and warm the area sufficiently or apply sufficient pressure to cause the two separate applications to merge into a single coherent mass.

The conductive compositions herein described and claimed may be used for connecting wire conductors together, connecting instrument and component leads to connecting wires, connecting the cells of dry batteries, and for many other purposes. Compositions which incorporate unmilled precipitated silver in microcrystalline wax exhibit specific conductances in excess of 65 reciprocal ohm-centimeters, those made from mill ground silver in microcrystalline wax in excess of 650 reciprocal ohm-centimeters, those made from mill ground silver in mixed soft and hard wax in excess of 1200 reciprocal ohm-centimeters. These compositions become quite fluid when moderately heated, being thus easily applied with simple equipment, and cool and set almost immediately. They seal the surfaces to which they are applied and effectively connect to conductors such as magnesium, aluminum and carbon to which soldering is difficult or impossible.

Invention is claimed as follows:

1. A coherent electrically conductive composition consisting essentially of finely divided silver in a wax-like binder-lubricant wherein the silver constitutes at least 80% of the weight of the composition.

2. A coherent electrically conductive composition consisting essentially of finely divided silver in a waxlike binder-lubricant wherein the silver constitutes at least 85% of the weight of the composition.

3. A coherent electrically conductive composition consisting essentially of finely divided silver in a wax-like binder-lubricant, the amount of silver incorporated in said composition being such that the conductance of said composition is in excess of about 65 reciprocal ohm-centimeters.

4. A coherent electrically conductive composition consisting essentially of finely divided silver in a wax-like binder-lubricant, the amount of silver incorporated in said composition being such that the conductance of said composition is in excess of about 650 reciprocal ohm-centimeters.

5. A coherent electrically conductive composition consisting essentially of finely divided silver in a wax-like binder-lubricant, the amount of silver incorporated in said composition being such that the conductance of said composition is in excess of 1200 reciprocal ohm-centimeters.

6. A coherent electrically conductive composition consisting essentially of finely divided silver in a wax-like binder-lubricant wherein the silver particles are of the physical form of silver particles formed by chemical precipitation followed by milling, the silver constituting at least 80% of the weight of the composition.

7. A coherent electrically conductive composition consisting essentially of microcrystalline wax impregnated with finely divided silver, the silver constituting at least 80% of the weight of the composition.

8. A coherent electrically conductive composition consisting essentially of microcrystalline wax impregnated with milled precipitated silver, the silver constituting at least 85% of the weight of the composition.

9. A coherent electrically conductive composition consisting essentially of a binder-lubricant consisting of a mixture of soft waxlike material and a minor proportion of a hard wax, the mixture being impregnated with a finely divided silver, the silver constituting at least 80% of the weight of the composition.

10. A coherent electrically conductive composition consisting essentially of a binder-lubricant consisting of a mixture of soft waxlike material and a minor proportion of a hard wax, the mixture being impregnated with finely divided silver, the silver constituting at least 85% of the weight of the composition.

References Cited in the file of this patent

UNITED STATES PATENTS

| | | |
|---|---|---|
| 804,664 | Leisel | Nov. 14, 1905 |
| 812,494 | Hussey | Feb. 13, 1906 |
| 1,245,862 | Brierly et al. | Nov. 6, 1917 |
| 1,994,849 | Bauza | Mar. 19, 1935 |
| 2,280,135 | Ward | Apr. 21, 1942 |
| 2,408,124 | Rolfes | Sept. 24, 1946 |
| 2,423,290 | Bonwitt | July 1, 1947 |
| 2,441,945 | Frolich et al. | May 25, 1948 |
| 2,444,034 | Collings et al. | June 29, 1948 |
| 2,462,018 | Wood | Feb. 15, 1949 |
| 2,666,803 | Kurlandsky | Jan. 19, 1954 |

OTHER REFERENCES

The Chemistry and Technology of Waxes, Warth Reinhold Publishing Corp., New York, N. Y., 1947, pages 258–9.